United States Patent
Fedowitz (10) Patent No.: US 11,728,635 B2
(45) Date of Patent: *Aug. 15, 2023

(54) APPARATUS FOR JOINING EXTENDED LENGTHS OF CONDUIT

(71) Applicant: John Fedowitz, Fredericksburg, VA (US)

(72) Inventor: John Fedowitz, Fredericksburg, VA (US)

(73) Assignee: John Fedowitz, Fredericksburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/939,554

(22) Filed: Jul. 27, 2020

(65) Prior Publication Data

US 2020/0358271 A1 Nov. 12, 2020

Related U.S. Application Data

(63) Continuation of application No. 15/486,629, filed on Apr. 13, 2017, now Pat. No. 10,727,658.

(51) Int. Cl.
*H02G 3/06* (2006.01)
*H02G 3/04* (2006.01)

(52) U.S. Cl.
CPC ............ *H02G 3/06* (2013.01); *H02G 3/0481* (2013.01)

(58) Field of Classification Search
CPC ........ F16L 15/08; F16L 19/02; H02G 3/0841; H02G 3/06; H02G 3/0481
See application file for complete search history.

(56) References Cited

U.S. PATENT DOCUMENTS

| | | | |
|---|---|---|---|
| 1,735,991 A | 11/1929 | Bennett | |
| 2,067,644 A | 1/1937 | Olley et al. | |
| 2,638,222 A | 5/1953 | Roach | |
| 2,704,426 A | 3/1955 | Macaulay | |
| 2,907,242 A | 10/1959 | Chakroff | |
| 3,239,245 A | 3/1966 | Press et al. | |
| 3,532,012 A | 10/1970 | Pryor | |
| 4,461,354 A | 7/1984 | Buras et al. | |
| 4,487,434 A | 12/1984 | Roche | |
| 5,058,929 A | 10/1991 | Zentner et al. | |
| 5,232,250 A | 8/1993 | Bonacci | |
| 5,934,853 A | 8/1999 | Junkers | |
| 6,464,260 B2 | 10/2002 | Barrier | |
| 6,676,168 B2 | 1/2004 | Mcaliley | |
| 7,077,436 B1 | 7/2006 | Krywitsky | |
| 7,500,412 B1 | 3/2009 | Maciejewski | |
| 7,686,342 B2 | 3/2010 | Jennings et al. | |
| 7,686,351 B2 | 3/2010 | Molina et al. | |

(Continued)

OTHER PUBLICATIONS

Product Brochure for RIGID 700 Hand-Held Power Drive, Jan. 1, 2005 (2 pages).

(Continued)

*Primary Examiner* — David Bochna
(74) *Attorney, Agent, or Firm* — Buchanan Ingersoll & Rooney PC (57) ABSTRACT

An apparatus for joining extended lengths of conduit. The apparatus provides a means for decreasing the time required to assemble extended lengths of conduit. The apparatus comprises an apparatus head, an extender joining body and a conduit interface.

16 Claims, 3 Drawing Sheets

(56) References Cited

U.S. PATENT DOCUMENTS

| | | |
|---|---|---|
| 7,757,366 B2 | 7/2010 | Vorley et al. |
| 7,824,130 B2 | 11/2010 | Koch et al. |
| 10,727,658 B2 * | 7/2020 | Fedowitz ................. H02G 3/06 |

OTHER PUBLICATIONS

Ridge Tool Company, Rigid 700 Power Drive Manual, Dec. 2016 (347 pages).

* cited by examiner

APPARATUS FOR JOINING EXTENDED LENGTHS OF CONDUIT

RELATED APPLICATIONS

The present application is a continuation of U.S. patent application Ser. No. 15/486,629, filed on Apr. 13, 2017, now U.S. Pat. No. 10,727,658 issued Jul. 28, 2020. The entire contents of the earlier application are hereby incorporated by reference in their entirety.

BACKGROUND OF THE INVENTION

In the electrical wiring and related industries and arts, a tube is used to protect and route electrical wiring in a building or structure. This tube is called electrical conduit. Electrical conduit may be made of many types of materials and commonly is made of metal, plastic, fiber, or fired clay. Most commonly conduit is rigid and inflexible. Electricians and those of skills in the electrical arts at the site of installation of electrical equipment typically install conduit. The installation of conduit is labor intensive and requires each individual piece of conduit to be threaded to joining devices called a coupling. The threaded coupling and conduit are then threaded to another piece of conduit and coupling. This process is then repeated until a specific length of coupling is joined together to facilitate the passage of wiring through the conduit. The use, form, and installation details of conduit are often specified by wiring regulations, such as the US National Electrical Code (NEC) and other building codes.

The origins of early electric lighting installations trace the use of existing gas pipe serving gas light fixtures which had been converted to electric lamps. Since this technique provided very good mechanical protection for interior wiring, it was extended to all types of interior wiring and by the early 20th century purpose-built couplings and fittings were manufactured for use in the electrical arts. The electrical wiring arts evolved and electrical codes now prohibit the routing of electrical conductors through gas piping due to concerns about causing damage to electrical insulation from the rough interiors of pipes and fittings that are used for gas.

Electrical conduit provides very good protection to enclosed conductors from impact, moisture, and chemical vapors. Electrical conduit has varying numbers, sizes, and allows different types of wiring to be pulled into the conduit. This simplifies the design and construction when comparing it to requiring multiple runs of cables. In addition, because wiring systems in buildings may be changed over the course of time, conduit allows the ease of changing wiring. Conduit also makes changing wiring simpler and safer as existing conductors can be withdrawn and new conductors installed, with little disruption along the path of the conduit.

A layout of conduit can be made waterproof or submersible. The use of metal conduit can shield sensitive circuits from electromagnetic interference. The use of metal conduit can also prevent emission of such interference from enclosed power cables. In addition, conduit will not permit the flow of flammable gases and vapors with seal offs. This result provides protection from fire and explosion hazard in areas handling volatile substances.

In the construction of structures, there is a need to encase conduit in concrete and certain types of conduit are approved for this use. Encasement in this manner is typically used in commercial buildings to allow electrical and communication outlets to be installed in the middle of large open areas.

Some types of metal conduit may also serve as a useful bonding conductor for grounding. Some wiring regulations may also dictate standards or supplemental means of grounding for certain types of conduit.

Conduits must be installed by electricians following standard regulations, as those provided by the National Electrical Code (NEC).

Electrical conduit is called Galvanized Rigid Conduit or Rigid Metal Conduit (RMC). A conduit made from galvanized steel tubing is commonly referred as a rigid conduit. The thickness of a galvanized rigid conduit protects the electrical wiring from being hit and allows it to be threaded. Galvanized rigid conduits are used by electricians in commercial and industrial applications normally available in 10 foot and 20 foot lengths and may be used in shorter lengths as necessary and available or through the process of cutting and placing threads on the shortened conduit.

Rigid Metal Conduit (RMC) and Rigid Steel Conduit (RSC) are the heaviest and thickest types of conduit. They are typically made of coated steel, stainless steel, red brass or aluminum. These pipes can be installed above ground or underground. The threads on the uncoupled end of the pipes are covered by industry color-coded thread protectors, which protect the threads, keeping them clean and sharp.

RMCs and RSCs are generally corrosive resistant and optionally come with a layer of PVC or zinc added to areas that are wet or highly corrosive. The zinc coating provides extra coating in areas that are wet, or highly corrosive. Galvanized Rigid Conduit (GRC) are created by taking RMC, RSC, or IMC and galvanizing it via hot dipping it in zinc.

Aluminum is also used and is cheaper than a galvanized rigid conduit and lighter than a GRC conduit. Intermediate metal conduit (IMC) is steel tubing heavier than EMT but lighter than RMC.

Rigid electrical conduit is also available as Electrical Metallic Tubing (EMT). An EMT conduit is made of steel. Electrical metallic tubing (EMT), sometimes called thin-wall, is commonly used instead of galvanized rigid conduit (GRC), as it is less costly and lighter than GRC. Lengths of conduit are connected to each other and to equipment with clamp-type fittings. Like GRC, EMT is more common in commercial and industrial buildings than in residential applications. EMT is generally made of coated steel, though it may be aluminum. EMT is also a very popular material in commercial and industrial buildings because it can be bent to specific radius and directions and it is thinner than RMC.

SUMMARY OF THE INVENTION

The object of the invention is to provide an apparatus and a method for joining extended lengths of conduit. The apparatus and method for joining extended lengths of conduit provide a means for decreasing the time required to assemble extended lengths of conduit. Current practice in the electrical arts for the assembly of conduit requires one or more individuals to place along a predetermined tract, lengths of conduit and couplings and then individually assemble each piece of conduit to a coupling and then to an additional length of conduit and to repeat until the length of conduit is complete. Each of these steps then requires one or more individuals to apply sufficient torque to each piece of conduit and coupling screwing them together and joining the lengths. This current process of assembling conduit to coupling can take many hours to complete depending on the length of conduit. The claimed apparatus and methods provide a means to significantly decrease the length of time required to assemble extended lengths of conduit along a predetermined tract. The significant decrease of time required to assemble extended lengths of conduit also demonstrates an unexpected property unique to the invention at hand.

The current invention apparatus comprises a cylindrical apparatus head with a torque application interface arranged around the circumference of the cylindrical apparatus head comprising indentions between two shoulders, an extender joining body, an abutting plate, and a cylindrical conduit interface comprising a threaded interior surface. An alternative embodiment of the invention comprises a cylindrical apparatus head with a torque application interface arranged around the circumference of the cylindrical apparatus head comprising indentions between two shoulders, an extender joining body comprising open venting regions around the circumference of the extender joining body, an abutting plate, wherein the abutting plate is permanently fixed to the conduit interface, and a cylindrical conduit interface comprising a threaded interior surface for interfacing with ½ inch, ¾ inch, 1 inch, 1¼ inch, 1½ inch, 2 inch, 2½ inch, 3 inch, 3½ inch, 4 inch, 5 inch, 6 inch, 16 mm, 21 mm, 27 mm, 35 mm, 41 mm, 53 mm, 63 mm, 78 mm, 91 mm, 103 mm, 129 mm, and 155 mm conduit as well as other size conduit used in the art. Another alternative embodiment of the invention comprises a cylindrical apparatus head with a torque application interface arranged around the circumference of the cylindrical apparatus head between two shoulders, an extender joining body possessing openings around the circumference of the extender joining body and further comprising a means for attachment to an abutting plate, an abutting plate, wherein the abutting plate is permanently fixed to the conduit interface, and, a cylindrical conduit interface comprising a threaded interior surface for interfacing with ½ inch, ¾ inch, 1 inch, 1¼ inch, 1½ inch, 2 inch, 2½ inch, 3 inch, 3½ inch, 4 inch, 5 inch, 6 inch, 16 mm, 21 mm, 27 mm, 35 mm, 41 mm, 53 mm, 63 mm, 78 mm, 91 mm, 103 mm, 129 mm, and 155 mm conduit as well as other size conduit used in the art.

Embodiments of the present invention possess an apparatus head comprising a tapered alignment head. Embodiments of the present invention comprise a torque application interface possessing tab or tabbed indentions, indentions, and teeth. Embodiments of the present invention may comprise an extender joining body that is permanently fixed to the abutting plate. Embodiments of the present invention may comprise an extender joining body that is detachable from the abutting plate. Embodiments of the present invention may comprise an extender joining body with threaded screw holes at a location that interfaces with the abutting plate and wherein the abutting plate possesses threaded screw holes at a location that interfaces with the extender joining body. Embodiments of the present invention may comprise a conduit interface comprising a threaded interior surface further comprising threading along the entire length of the interior of the conduit interface up to the abutting plate. Embodiments of the present invention may comprise threaded interior surface possesses a tapered interior surface circumference.

The current invention methods comprise the steps of placing two or more lengths of metal conduit in series along a length of tract to which conduit is to be laid, placing metal conduit couplings between each of the lengths of metal conduit, attaching the metal conduit couplings by a screwing motion to the ends of each of the lengths of metal conduit to begin threading the metal conduit coupling to the lengths of metal conduit, stabilizing the terminal end of the lengths of metal conduit to prevent rotation, connecting an apparatus for joining lengths of conduit to the near end of the lengths of metal conduit using an embodiment of the apparatus described above.

An alternative embodiment of the current invention methods comprise the steps of connecting an embodiment of the apparatus described above for joining lengths of conduit to the near end of a length of metal conduit, placing two or more lengths of metal conduit in series to the near end of a length of metal conduit along a length of tract to which conduit is to be laid, placing metal conduit couplings between each of the lengths of metal conduit, attaching the metal conduit couplings by a screwing motion to the ends of each of the lengths of metal conduit to begin threading the metal conduit coupling to the lengths of metal conduit, stabilizing the terminal end of the lengths of metal conduit to prevent rotation, and, applying torque to the torque application interface, wherein the apparatus screws the lengths of metal conduit to each of the metal conduit couplings to join extended lengths of metal conduit.

An alternative embodiment of the current invention methods comprise the steps of placing two or more lengths of threaded metal conduit in series along a length of tract to which conduit is to be laid, between each of the lengths of metal conduit placing metal conduit couplings attaching the metal conduit couplings by a screwing motion to the ends of each of the lengths of metal conduit to begin threading the metal conduit coupling to the lengths of metal conduit, stabilizing the terminal end of the lengths of metal conduit to prevent rotation, connecting an embodiment of the apparatus described above for joining lengths of conduit to the near end of the lengths of metal conduit, and, applying torque to the torque application interface, wherein the apparatus screws the lengths of metal conduit to each of the metal conduit couplings to join extended lengths of metal conduit.

Embodiments of the method may comprise the use of lengths of metal conduit that are ½ inch, ¾ inch, 1 inch, 1¼ inch, 1½ inch, 2 inch, 2½ inch, 3 inch, 3½ inch, 4 inch, 5 inch, 6 inch, 16 mm, 21 mm, 27 mm, 35 mm, 41 mm, 53 mm, 63 mm, 78 mm, 91 mm, 103 mm, 129 mm, and 155 mm in diameter as well as other size conduit used in the art. Embodiments of the method may comprise the use of conduit couplings are sized to fit said lengths of metal conduit having ½ inch, ¾ inch, 1 inch, 1¼ inch, 1½ inch, 2 inch, 2½ inch, 3 inch, 3½ inch, 4 inch, 5 inch, 6 inch, 16 mm, 21 mm, 27 mm, 35 mm, 41 mm, 53 mm, 63 mm, 78 mm, 91 mm, 103 mm, 129 mm, and 155 mm diameter as well as other size couplings used in the art. Embodiments of the method comprise the use of stabilizing the terminal end through a connection to a junction box, pipe wrench, or a tightening device to stop rotation. Embodiments of the method may comprise placing two or more lengths of metal conduit in series along a length of tract to which conduit is to be laid is in a horizontal position. Embodiments of the method may comprise a connecting step of threading the cylindrical conduit interface to the near end of the length of metal conduit.

BRIEF DESCRIPTION OF FIGURES

The present teachings will become more fully understood from the detailed description and the accompanying drawings, wherein.

DETAILED DESCRIPTION OF THE INVENTION

Figure 1:
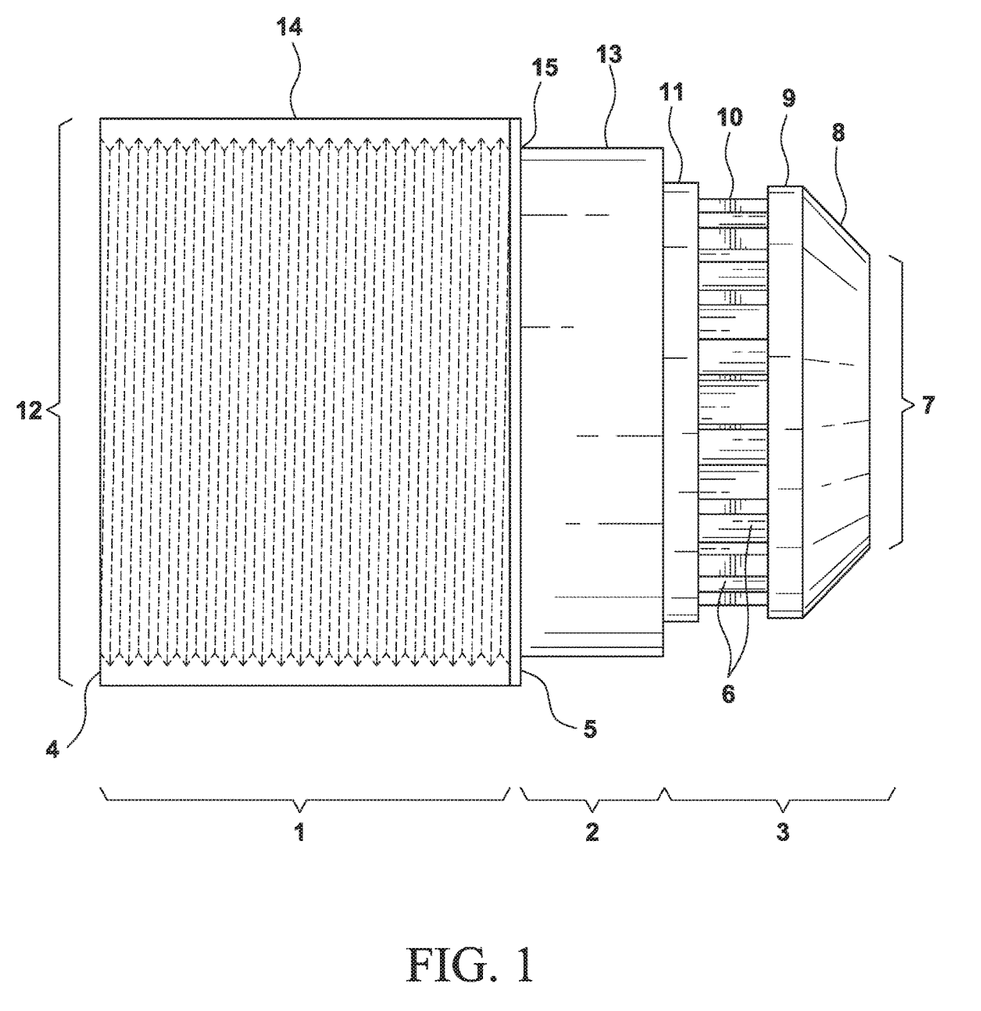
FIG. 1 is a side view of an apparatus for joining lengths of conduit according to the present teachings.
Figure 2:
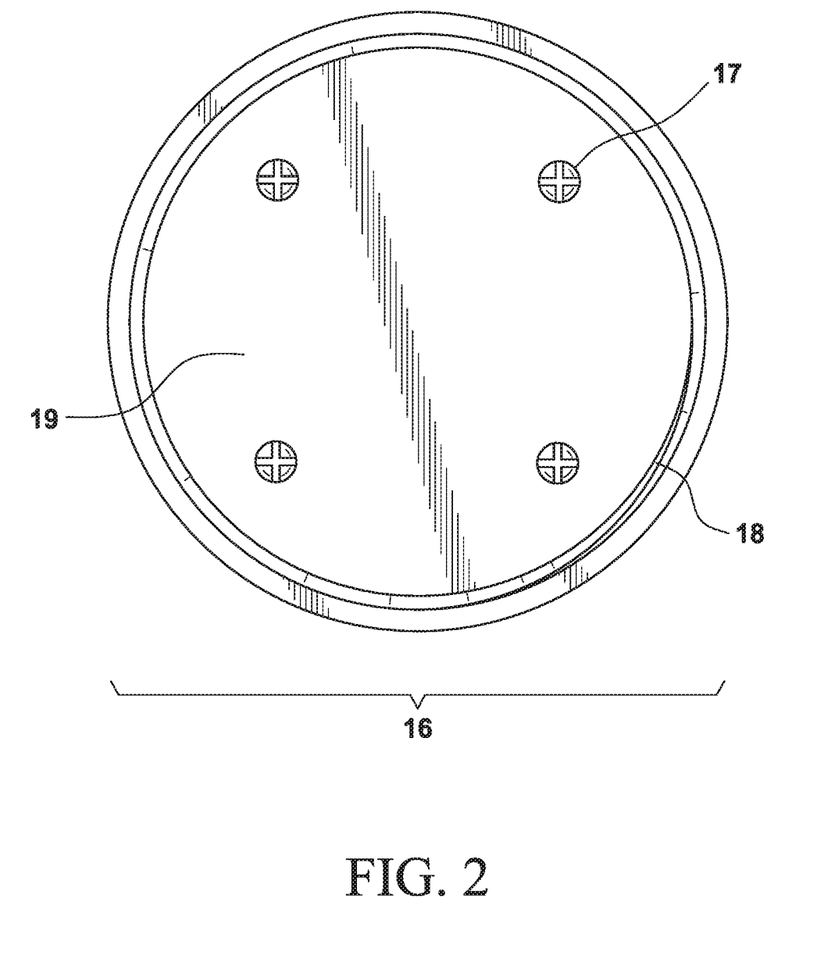
FIG. 2 is a bottom view through the conduit interface according to the present teachings.
Figure 3:
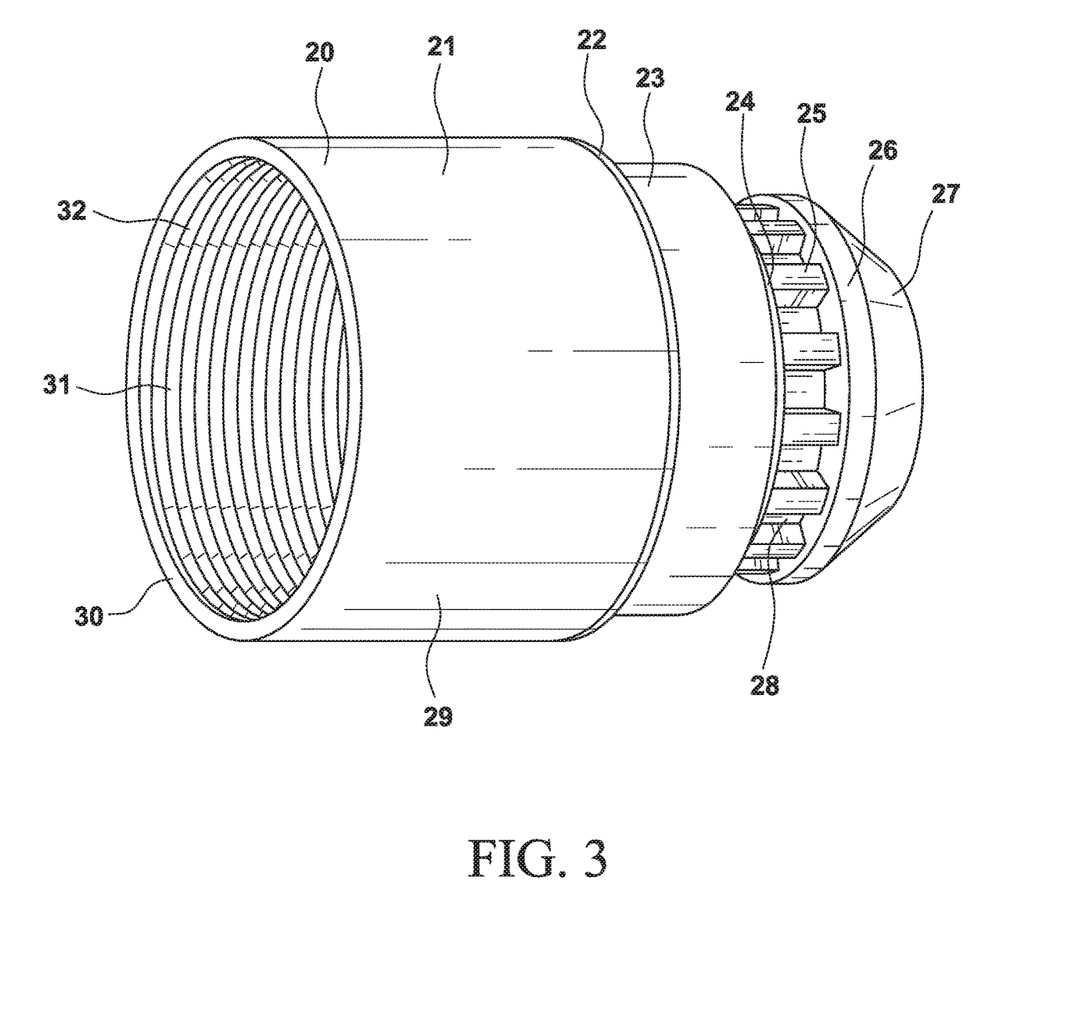
FIG. 3 is a perspective view displaying the threaded nature of the interior surface of the conduit interface according to the present teachings.

The current invention apparatus comprises a cylindrical conduit interface 1, extender joining body 2, and an apparatus head 3. Between the extender joining body and conduit interface is a abutting plate 5, 19 and 22.

The apparatus head 3 possesses a torque application interface 10 and 25 arranged around the circumference of the cylindrical apparatus head 3. The torque application interface 10 and 25 comprises indentions 6 and 28. These indentions may comprise teeth or gears 6 and 28 for interacting with a torque application device. There may one or more of these indentations arranged around the circumference of the cylindrical apparatus head 3. In the event that there is a single indentation, it may be placed at a location around the circumference of the cylindrical apparatus head 3. The torque application interface 10 and 25 is placed between two shoulders identified as a near shoulder 9 and 26 and a far shoulder 11 and 24. The shape of the near shoulder 9 and 26 and far shoulder 11 and 24 may be a right angle or rounded. At the terminal end of the apparatus head 3 is an alignment edge 8 and 27. The alignment edge 8 and 27 may or may not be angled with a narrowing circumference in a direction away from the near shoulder 9 and 26. As a result, the terminal end of the apparatus head 3 will have a varying diameter 7.

The extender joining body 2 is located between the far shoulder 11 and 24 and the abutting plate 5 and 19 portion of the cylindrical conduit interface 1. The extender joining body 2 may be permanently fixed to or detachable from the abutting plate 5, 19 and 22 and cylindrical conduit interface 1 at 15. The extender joining body is cylindrical in nature may comprise a solid surface 13 and 23. The surface of the extender joining body may also comprise one or more opening or venting regions around its circumference. These venting regions may have an angular or rounded form. The underside of the extender joining body may comprise one or more means 17 for attachment to the abutting plate 5, 19 and 22 and cylindrical conduit interface 1. The means 17 for attachment may comprise screwing, snapping, using a spline interface, locking plug or other means permitting a secured attachment between the extender joining body the abutting plate 5, 19 and 22 and cylindrical conduit interface 1. There may be one or more of these and they may be placed at any location on the abutting plate and may be located centrally A cylindrical conduit interface 1 is attached to the abutting plate butting plate 5, 19 and 22. The cylindrical conduit interface 1 comprises a base 4, 18 and 30 located opposite from the abutting plate. The length of the cylindrical conduit interface 1, 14 and 21 varies. The diameter of the cylindrical conduit interface 1, 14 and 21 may be larger or smaller than the diameter of the extender joining body as shown by 12, 16, 20 and 29. The diameter of the cylindrical conduit interface may also be the same as that of the extender joining body. Alternatively, the diameter of the cylindrical conduit interface 1 may be the same as the diameter of the extender joining body as shown by 12 and 16. The interior surface of the cylindrical conduit interface 1 is threaded 32. The threading conforms to the standards of one or more of NPT (national pipe taper or American National Standard Taper Pipe Thread), NPS (national pipe straight or American National Standard Straight Pipe Thread), NPSC (national pipe straight-coupling or American National Standard Straight Pipe Thread for Couplings), NPSF (national pipe straight-fuel or Dryseal USA (American) Standard Fuel Internal Straight Pipe Thread), NPSH (national pipe straight-hose or American National Standard Straight Pipe Thread for Hose Couplings), NPSI (national pipe straight-intermediate or Dryseal USA (American) Standard Intermediate Internal Straight Pipe Thread), NPSL (national pipe straight-locknut or American National Standard Straight Pipe Thread for Loose-fitting Mechanical Joints with Locknuts), NPSM (national pipe straight-mechanical or American National Standard Straight Pipe Thread for Free-fitting Mechanical Joints), NPTF (national pipe taper-fuel or Dryseal USA (American) Standard Taper Pipe Thread), NPTR (national pipe taper-railing or American National Standard Taper Pipe for Railing Joints), and, PTF-SAE SHORT (pipe taper, fuel, SAE, short or Dryseal SAE Short Taper Pipe Thread). In addition, the threaded 31 interior surface of the cylindrical conduit interface 1 is sized for interfacing with ½ inch, ¾ inch, 1 inch, 1¼ inch, 1½ inch, 2 inch, 2½ inch, 3 inch, 3½ inch, 4 inch, 5 inch, 6 inch, 16 mm, 21 mm, 27 mm, 35 mm, 41 mm, 53 mm, 63 mm, 78 mm, 91 mm, 103 mm, 129 mm, and 155 mm conduit as well as other size conduit used in the art.

Additional embodiments of the present invention possess an apparatus head comprising a tapered alignment head 8 and 27. Embodiments of the present invention comprise a torque application interface 10 and 25 possessing tab or tabbed indentions, indentions, and teeth 6 and 28. Embodiments of the present invention may comprise an extender joining body 2 that is permanently fixed to the abutting plate 5 and 22. Embodiments of the present invention may comprise an extender joining body 2 that is detachable from the abutting plate 5 and 22. Embodiments of the present invention may comprise an extender joining body 2 with threaded screw holes at a location that interfaces with the abutting plate 17 and wherein the abutting plate 5 and 22 possesses threaded screw holes 17 at a location that interfaces with the extender joining body 2. Embodiments of the present invention may comprise a conduit interface 1 comprising a threaded interior surface 31 further comprising threading along the entire length of the interior of the conduit interface up to the abutting plate 5 and 22. Embodiments of the present invention may optionally comprise threaded interior surface possesses a tapered interior surface 32 circumference wherein the taper narrows the circumference of the conduit interface as it approaches the abutting plate 5 and 22.

The current invention methods comprise the steps of placing two or more lengths of metal conduit in series along a length of tract to which conduit is to be laid. The placement of conduit may be indoors or outdoors, on natural surface such as soil or on manmade surface such as concrete or a metallic rack. A further step of the process requires placing metal conduit couplings between each of the lengths of metal conduit. The sequence of placement may be in serial placement or out of order. The next step in the process requires starting to thread or attaching the metal conduit couplings by a screwing or turning motion to the ends of each of the lengths of metal conduit. This will begin threading the metal conduit coupling to the lengths of metal conduit. In a preferred embodiment this would comprise two or three turns. The process then requires stabilizing the terminal end of the lengths of metal conduit to prevent rotation. Stabilization of the terminal end is accomplished through a connection to a junction box, pipe wrench, or a tightening device to stop rotation or spinning. Then the step of connecting an apparatus for joining lengths of conduit to the near end of the lengths of metal conduit using an embodiment of the apparatus described above. After the apparatus described above is threaded onto an opposite terminal end to that which is stabilized, a power drive device for applying torque to the torque application interface is attached and started. The torque may be applied to the torque application interface from the side of the claimed apparatus. After starting, the applied torque threads each length of conduit to each coupling completing joining extended lengths of conduit in an unexpectedly shorter amount of time than that which could be achieved through manual threading.

An alternative embodiment of the methods comprise the steps of connecting an apparatus for joining lengths of conduit to the near end of the lengths of metal conduit using an embodiment of the apparatus described above. Then placing two or more lengths of metal conduit in series along a length of tract to which conduit is to be laid. The placement of conduit may be indoors or outdoors, on natural surface such as soil or on manmade surface such as concrete or a metallic rack. A further step of the process requires placing metal conduit couplings between each of the lengths of metal conduit. The sequence of placement may be in serial placement of out of order. The next step in the process requires starting to thread or attaching the metal conduit couplings by a screwing or turning motion to the ends of each of the lengths of metal conduit. This will begin threading the metal conduit coupling to the lengths of metal conduit. In a preferred embodiment this would comprise two or three turns. The process then requires stabilizing the terminal end of the lengths of metal conduit to prevent rotation. Stabilization of the terminal end is accomplished through a connection to a junction box, pipe wrench, or a tightening device to stop rotation or spinning. After the apparatus described above is threaded onto an opposite terminal end to that which is stabilized, a power drive device for applying torque to the torque application interface is attached and started. The torque may be applied to the torque application interface from the side of the claimed apparatus. After starting, the applied torque threads each length of conduit to each coupling completing joining extended lengths of conduit in an unexpectedly shorter amount of time than that which could be achieved through manual threading.

A still further alternative embodiment of the current invention methods comprise the step of placing two or more lengths of threaded metal conduit in series along a length of tract to which conduit is to be laid. Then between each of the lengths of metal conduit a metal conduit coupling is placed. The metal conduit couplings are attached by a screwing motion to the ends of each of the lengths of metal conduit to begin threading the metal conduit coupling to the lengths of metal conduit. In a preferred embodiment this would comprise two or three turns. The process then requires stabilizing the terminal end of the lengths of metal conduit to prevent rotation. Then the step of connecting an apparatus for joining lengths of conduit to the near end of the lengths of metal conduit using an embodiment of the apparatus described above. After the apparatus described above is threaded onto an opposite terminal end to that which is stabilized, a power drive device for applying torque to the torque application interface is attached and started. The torque may be applied to the torque application interface from the side of the claimed apparatus. After starting, the applied torque threads each length of conduit to each coupling completing joining extended lengths of conduit in an unexpectedly shorter length of time than that which could be achieved through manual threading.

The embodiments of the methods described above confirms to the standards described above and are for use with varying lengths of metal conduit that are ½ inch, ¾ inch, 1 inch, 1¼ inch, 1½ inch, 2 inch, 2½ inch, 3 inch, 3½ inch, 4 inch, 5 inch, 6 inch, 16 mm, 21 mm, 27 mm, 35 mm, 41 mm, 53 mm, 63 mm, 78 mm, 91 mm, 103 mm, 129 mm, and 155 mm in diameter as well as other size conduit used in the art. In addition, embodiments of the methods may comprise the use of conduit couplings are sized to fit said lengths of metal conduit having ½ inch, ¾ inch, 1 inch, 1¼ inch, 1½ inch, 2 inch, 2½ inch, 3 inch, 3½ inch, 4 inch, 5 inch, 6 inch, 16 mm, 21 mm, 27 mm, 35 mm, 41 mm, 53 mm, 63 mm, 78 mm, 91 mm, 103 mm, 129 mm, and 155 mm diameter as well as other size couplings used in the art. Embodiments of the method may comprise placing two or more lengths of metal conduit in series along a length of tract to which conduit is to be laid is in a horizontal position or an angled position perpendicular to the horizontal position or any angle there between. Preferred embodiments of the claimed apparatus and methods are for use when the length of tract is in a horizontal position or within several degrees of the horizontal position. Embodiments of the method may comprise a connecting step of threading said cylindrical conduit interface to the near end of the lengths of metal conduit.

The apparatus and methods for joining extended lengths of conduit provide a means for decreasing the time required to assemble extended lengths of conduit. These unexpected and surprising results were demonstrated through the following data compiled in a head to head comparison between the manual method of joining extended lengths of conduit those methods claimed herein using the claimed apparatus.

For example, using the standard methods for assembling rigid conduit under timed conditions, two individuals placed fifteen ten foot lengths of four inch diameter conduit in series along a one hundred and fifty foot tract. In between each of the fifteen ten foot lengths of conduit, the two individuals placed fourteen four inch couplings. The individuals then started each coupling on the end of each ten foot length of four inch diameter conduit. Using pipe wrenches, the first individual held the conduit in a stabilized position while the second individual screwed the four inch coupling until it could not be tightened further. After completing the first conduit and coupling, the first individual then stabilized the assembled length of conduit and coupling while the second individual screwed a second piece of conduit to the opposite end of the coupling that was tightened to the previous length of conduit. The second individual then screwed the four inch diameter conduit to the coupling until it could not be tightened any further. This process was repeated for each of the lengths of four inch diameter conduit and their corresponding interspaced couplings along the one hundred and fifty foot tract of conduit until all fifteen ten foot lengths of four inch conduit and fourteen four inch conduit are assembled and tightened until they cannot be tightened further. The total time for completion of joining these extended lengths of conduit using standard methods took one hour and twelve minutes or seventy two minutes total.

Using the currently claimed methods and apparatus for assembling conduit and under timed conditions, two individuals placed fifteen ten foot lengths of four inch diameter conduit in series along a one hundred and fifty foot tract. In between each of the fifteen ten foot lengths of conduit, the two individuals placed fourteen four inch couplings. The individuals then started threading each coupling on the end of each ten foot length of four inch diameter conduit using approximately two to three turns. After starting the threading of the first single conduit and coupling, the first individual with the assistance of the second individual then using two to three turns started the threading of a second piece of conduit to the opposite end of the coupling that was started threaded to the previous length of conduit. This process was repeated for each of the lengths of four inch diameter conduit and their corresponding interspaced couplings along the one hundred and fifty foot tract of conduit until all fifteen ten foot lengths of four inch conduit and fourteen four inch conduit threading was started using two to three turns of each. The first individual then connected the apparatus as described herein for joining lengths of conduit to the near end of the lengths of conduit. The second individual then stabilized the far end of the lengths of conduit using a chain wrench. Torque was then applied to the apparatus resulting in the lengths of metal conduit and coupling being screwed together in a single step until each length of conduit and coupling cannot be tightened further. The total time for completion of joining these extended lengths of conduit using the currently claimed methods and apparatus took twenty six minutes.

By comparing the standard methods for assembling conduit to the currently claimed methods and apparatus for assembling conduit as set forth above demonstrates that using the claimed apparatus and methods result in a forty five minute decrease in time necessary to assemble conduit. Further, using the currently claimed methods and apparatus for assembling conduit as set forth above only require one third of the time (twenty six minutes) as that which is necessary using the standard technique that requires seventy two minutes to complete. The two-thirds decrease in time required for assembling conduit represents an unexpected and surprising benefit of using the claimed apparatus and methods. In addition, the decrease in physical labor required by the methods claimed herein as compared to those required for the standard methods of assembling conduit, allows individuals involved in the electrical arts to reserve their physical energy for other tasks and contributes to efficiency.

What is claimed is:

1. An apparatus for joining lengths of conduit, said apparatus comprising:
   a cylindrical apparatus head with a torque application interface;
   an extender joining body;
   an abutting plate; and,
   a cylindrical conduit interface comprising a threaded interior surface;
   wherein said abutting plate contacts the axial end of said cylindrical conduit interface; and,
   wherein said cylindrical apparatus head, said extender joining body, said abutting plate, and said cylindrical conduit interface are disposed in the stated order along a common longitudinal axis and are fixed relative to each other.

2. The apparatus of claim 1, wherein said apparatus head comprises a tapered alignment head.

3. The apparatus of claim 1, wherein said extender joining body is permanently fixed to said abutting plate.

4. The apparatus of claim 1, wherein said extender joining body is detachable from said abutting plate.

5. The apparatus of claim 1, wherein said extender joining body and abutting plate possess a means of attachment to each other.

6. The apparatus of claim 1, wherein said conduit interface comprising a threaded interior surface further comprises threading along the entire length of the interior of said conduit interface up to said abutting plate.

7. An apparatus for joining lengths of conduit, said apparatus comprising:
   a cylindrical apparatus head with a torque application interface;
   an extender joining body;
   an abutting plate, wherein said abutting plate is permanently fixed to a conduit interface; and,
   the cylindrical conduit interface comprising a threaded interior surface for interfacing with conduit having a diameter selected from the group consisting of ½ inch, ¾ inch, 1 inch, 1¼ inch, 1½ inch, 2 inch, 2½ inch, 3 inch, 3½ inch, 4 inch, 5 inch, 6 inch, 16 mm, 21 mm, 27 mm, 35 mm, 41 mm, 53 mm, 63 mm, 78 mm, 91 mm, 103 mm, 129 mm, or 155 mm;
   wherein said abutting plate contacts the axial end of said cylindrical conduit interface; and,
   wherein said cylindrical apparatus head, said extender joining body, said abutting plate, and said cylindrical conduit interface are disposed in the stated order along a common longitudinal axis and are fixed relative to each other.

8. The apparatus of claim 7, wherein said apparatus head comprises a tapered alignment head.

9. The apparatus of claim 7, wherein said extender joining body is permanently fixed to said abutting plate.

10. The apparatus of claim 7, wherein said extender joining body is detachable from said abutting plate.

11. The apparatus of claim 10, wherein said extender joining body and said abutting plate possess a means for attachment to each other.

12. The apparatus of claim 11, wherein said means for attachment comprise screwing, snapping, using a spline interface, locking plug or other means permitting a secured attachment between the extender joining body the abutting plate.

13. An apparatus for joining lengths of conduit, said apparatus comprising:
   a cylindrical apparatus head with a torque application interface;
   an extender joining body possessing a means for attachment to an abutting plate;
   an abutting plate, wherein said abutting plate is permanently fixed to a conduit interface; and,
   the cylindrical conduit interface comprising a threaded interior surface for interfacing with conduit having a diameter selected from the group consisting of ½ inch, ¾ inch, 1 inch, 1¼ inch, 1½ inch, 2 inch, 2½ inch, 3 inch, 3½ inch, 4 inch, 5 inch, 6 inch, 16 mm, 21 mm, 27 mm, 35 mm, 41 mm, 53 mm, 63 mm, 78 mm, 91 mm, 103 mm, 129 mm, or 155 mm conduit;
   wherein said abutting plate contacts the axial end of said cylindrical conduit interface; and,
   wherein said cylindrical apparatus head, said extender joining body, said abutting plate, and said cylindrical conduit interface are disposed in the stated order along a common longitudinal axis and are fixed relative to each other.

14. The apparatus of claim 13, wherein said extender joining body is detachable from said abutting plate.

15. The apparatus of claim 13, wherein said extender joining body and said abutting plate possess a means for attachment to each other.

16. The apparatus of claim 15, wherein said means for attachment comprise screwing, snapping, using a spline interface, locking plug or other means permitting a secured attachment between the extender joining body the abutting plate.

* * * * *